Dec. 16, 1969   M. A. MESSA ETAL   3,483,979
WATER PURIFICATION APPARATUS
Filed Oct. 21, 1965   7 Sheets-Sheet 1

INVENTORS.
MATTHEW A. MESSA
WALTER TURNICKY

BY Seidel & Gonda

ATTORNEYS.

INVENTORS.
MATTHEW A. MESSA
WALTER TURNICKY

BY Seidel & ...

ATTORNEYS.

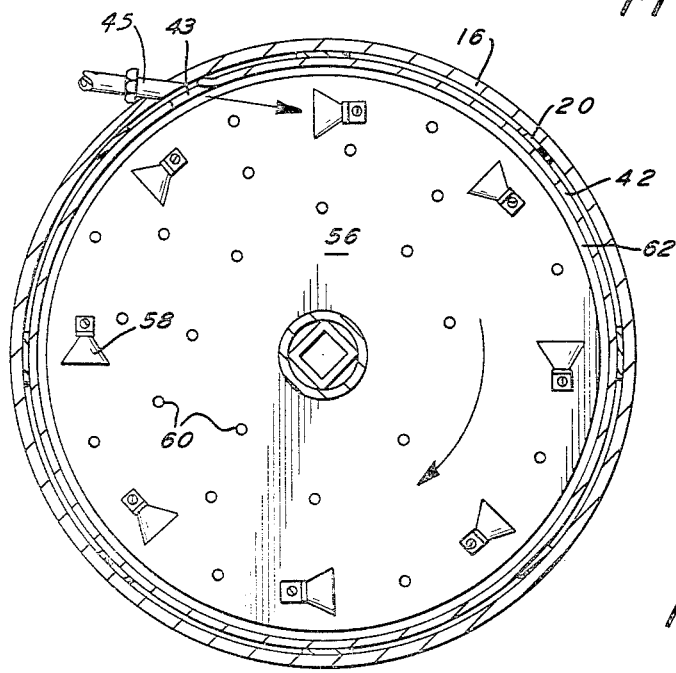
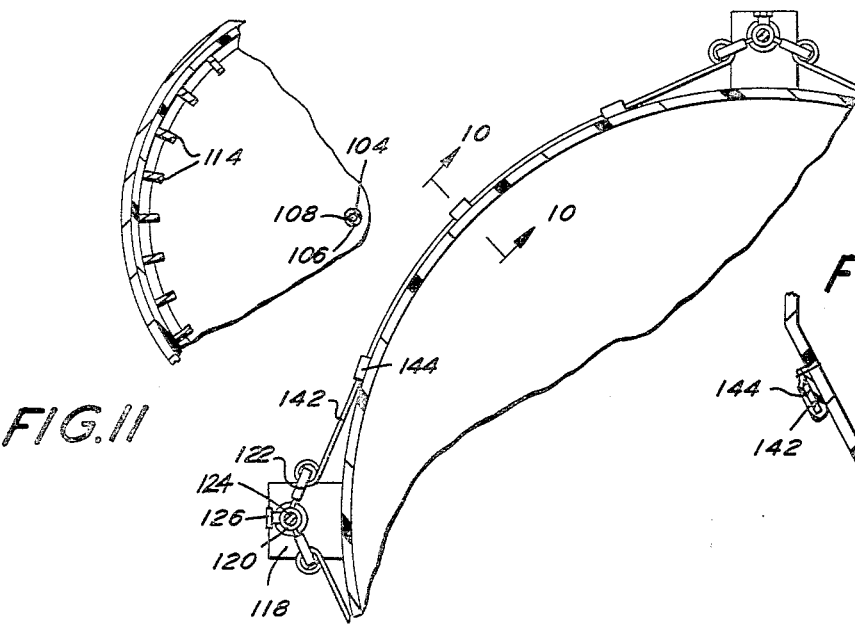

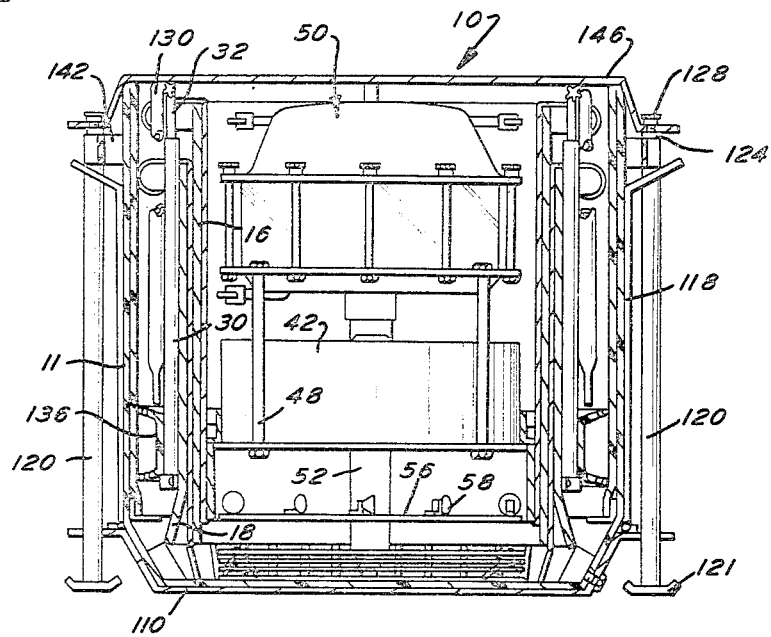
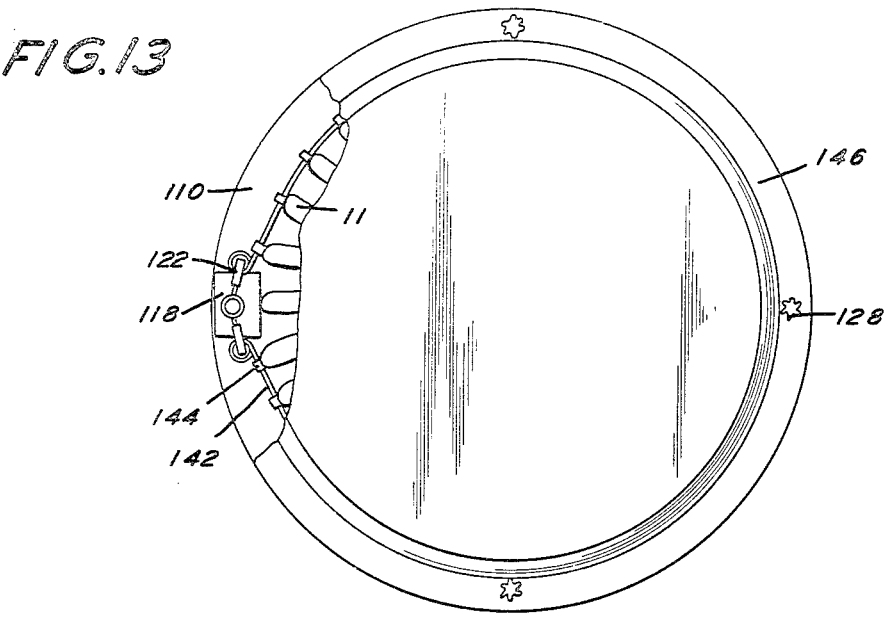

United States Patent Office 3,483,979
Patented Dec. 16, 1969

3,483,979
WATER PURIFICATION APPARATUS
Matthew A. Messa, Wyncote, and Walter Turnicky, Chalfont, Pa., assignors, by mesne assignments, to Matthew A. Messa, Wyncote, Pa.
Filed Oct. 21, 1965, Ser. No. 499,355
Int. Cl. B01d 35/02
U.S. Cl. 210—94                                    31 Claims

ABSTRACT OF THE DISCLOSURE

Water treatment apparatus is disclosed, comprising a collapsible and portable upflow clarifier. The clarifier includes a telescoping cylindrical downcomer disposed centrally of a collapsible clarifier well. A water turbine-driven agitator is provided in the downcomer, the turbine being disposed in a housing slidably received in the downcomer. The agitator is itself collapsible. A solution feed vessel, for feeding chemicals to the water, is coupled to the turbine housing. Also, a filter unit is coupled to the housing. The dimensions of the filter unit and solution feed vessel are such that they may be wholly disposed within the downcomer when the apparatus is in a collapsed condition. The collapsible clarifier well is constructed of flexible material, and is provided with telescoping support legs. The support legs are interconnected, in a preferred form of the invention, by constant tensioned spiral springs. The springs cause the clarifier to assume a desired shape during collapsing. When the apparatus is in a collapsed condition, a rigid portion of the clarifier well cooperates with the legs and an auxiliary cover portion to form a readily rollable generally cylindrical package.

---

This invention relates to water purification apparatus. More particularly, this invention relates to water purification apparatus which purifies non-saline raw water by putting it through the steps of aeration, coagulation, clarification, disinfection and filtration. Still more particularly, this invention deals with a collapsible and easily portable apparatus for purifying water having any degree of turbidity and containing potentially harmful microorganisms.

Various apparatus have been proposed in the past to treat raw water in the above-mentioned manner to render it potable. Notably successful in accomplishing this aim is the packaged system produced by the assignee of the present application and sold under the trademark "Helifloc." In this system, raw water is introduced into a vertically oriented chamber of downcomer, where it is agitated and mixed with chemicals, which cause the formation of gelatinous floc particles in suspension. The water-chemical mixture is subjected to agitation in the downcomer to insure effective mixing. The flocculated water passes out of the lower end of the downcomer and into a clarifier well.

The clarifier well is so designed as to establish a suspended bed or blanket of floc particles which adsorbs foreign substances contained in the raw water. The suspension of the floc blanket is controlled by a balance between the hydraulic forces due to the upward flow of the water and the weight of the floc particles.

Water traveling through the floc blanket is collected in a weir and conducted to a storage zone or wet well. Disinfecting chemicals may be added during mixing in the downcomer or after clarification.

With the above treatment, 98 to 99 percent of the turbidity of the raw water may be removed.

After clarification, the water is subjected to filtration. Advantageously, this may be accomplished by passing the water through a layer of micro-porous diatomaceous silica to remove the remainder of the suspended particles and colloidal matter, as well as bacteria, from the water.

Although no fault has been found with the chemical performance of apparatus such as that described above, the systems heretofore known have been subject to certain limitations on portability due to their relatively large size and weight. Thus, one form of the above-mentioned "Helifloc" system, which was itself a considerable advance over prior apparatus, weighs approximately 1,430 pounds and produces 600 gallons of finished water per hour. Such a system is mounted on a skid approximately 4 feet by 8 feet and requires a small truck for transport. Accordingly, it is an object of the present invention to produce a water purification apparatus in which the size and weight is considerably less than those heretofore known.

It is another object of this invention to produce a water purification apparatus of smaller size and lower weight than those heretofore known by combining the functions of various components to thereby reduce in number the various parts of the system.

It is yet another object of this invention to produce a water purification apparatus which is more easily transported than those heretofore known.

It is still another object of this invention to produce a water purification apparatus which may be collapsed into a compact and durable bundle for transport.

It is another object of this invention to produce a filter for use with water purification apparatus which is more compact than those heretofore known.

Other objects will appear hereinafter.

For the purpose of illustrating the invention, there are shown in the drawings forms which are presently preferred; it being understood, however, that this invention is not limited to the precise arrangements and instrumentalities shown.

FIGURE 7 is a sectional view taken along the line 7—7 in FIGURE 4.

FIGURE 9 is a partial sectional view showing details of the legs, clarifier and springs used in the present invention.

FIGURE 10 is a partial sectional view along the line 10—10 in FIGURE 9.

FIGURE 11 is a partial sectional view showing details of the bottom pan of the clarifier used in the present invention.

FIGURE 12 is an elevation view, in cross section, showing the apparatus of the present invention in its collapsed position.

FIGURE 13 is a plan view, partially broken away, showing the apparatus in its collapsed position.

FIGURE 14 is an elevation view showing a means which may be used in conjunction with the apparatus in its collapsed form for facilitating transport.

Figure 3:
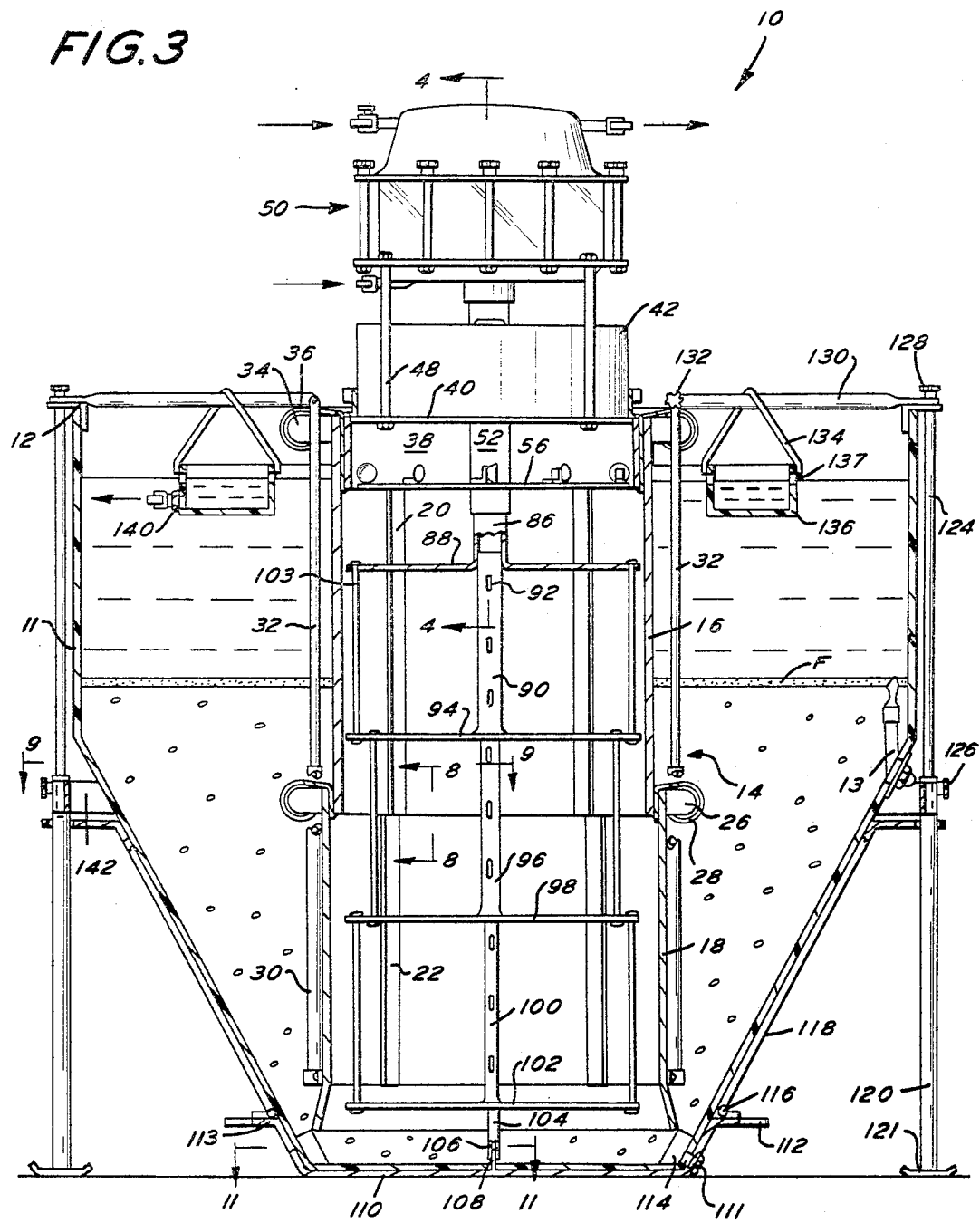
FIGURE 3 is a sectional view taken along the line 3—3 in FIGURE 2.

Referring to the drawings in detail, wherein like numerals indicate like elements, there is illustrated in FIGURE 3 a water purification apparatus designated generally as 10. The apparatus 10 includes a clarifier well 11 which includes a generally cylindrical upper portion and a generally frusto-conical lower portion having a closed lower end. The clarifier well 11 includes support brackets 12 at spaced points around its lower periphery, and a valve fitting 13, the purpose of which will be more fully described below.

The clarifier well liner is constructed of relatively thin plastic polymeric material, encased in a container of synthetic or natural rubber, or a composite construction of fabric reinforced plastic or rubber.

A downcomer 14 in the form of an upright hollow cylinder is supported with a lower edge in spaced relation to the closed lower end of the clarifier well. The downcomer 14 includes an upper portion 16 and a lower portion 18. The upper portion 16 of the downcomer has an external diameter of slightly less than the interior diameter of the lower portion 18. Thus, the upper portion 16 may be telescoped within the lower portion 18. The lower portion 18 includes a flared bottom portion.

Figure 8:
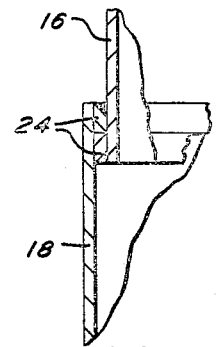
FIGURE 8 is a detail view of a sealing means used in the novel apparatus.

Teflon strips 22 are secured on the inner periphery of the lower portion 18 of the downcomer 14 and provide a bearing surface against which the upper portion 16 may rest during telescoping. Bands 24 of Teflon are placed at the outer periphery of the lower edge of the upper portion 16 of the downcomer, and at the inner periphery of the upper edge of the lower portion. As shown in FIGURE 8, the respective peripheral bands are in abutting relation when the respective upper and lower portions of the downcomer 14 are in the positions shown in FIGURE 4.

Spring brackets 26 are secured to the lower portion 18 at circumferentially spaced points adjacent its upper edge. The brackets 26 serve as supports for spiral springs 28, the free ends of which are secured adjacent the bottom of the upper portion 16. The springs 28 are preferably of the constant tension type sold under the trademark "Negator."

Tubular members 30 are secured at circumferentially spaced points to the outer surface of the lower portion 18 and extend parallel to the axis of the downcomer. Brackets 34 are secured at circumferentially spaced points adjacent the upper edge of the upper portion 16. Rods 32 are slidably received in the tubular member 30 and have their respective upper ends secured to the support member 130. Thus, the rods 32 and tubular members 30 prevent relative rotation of the upper and lower portions of the downcomer.

Figure 4:
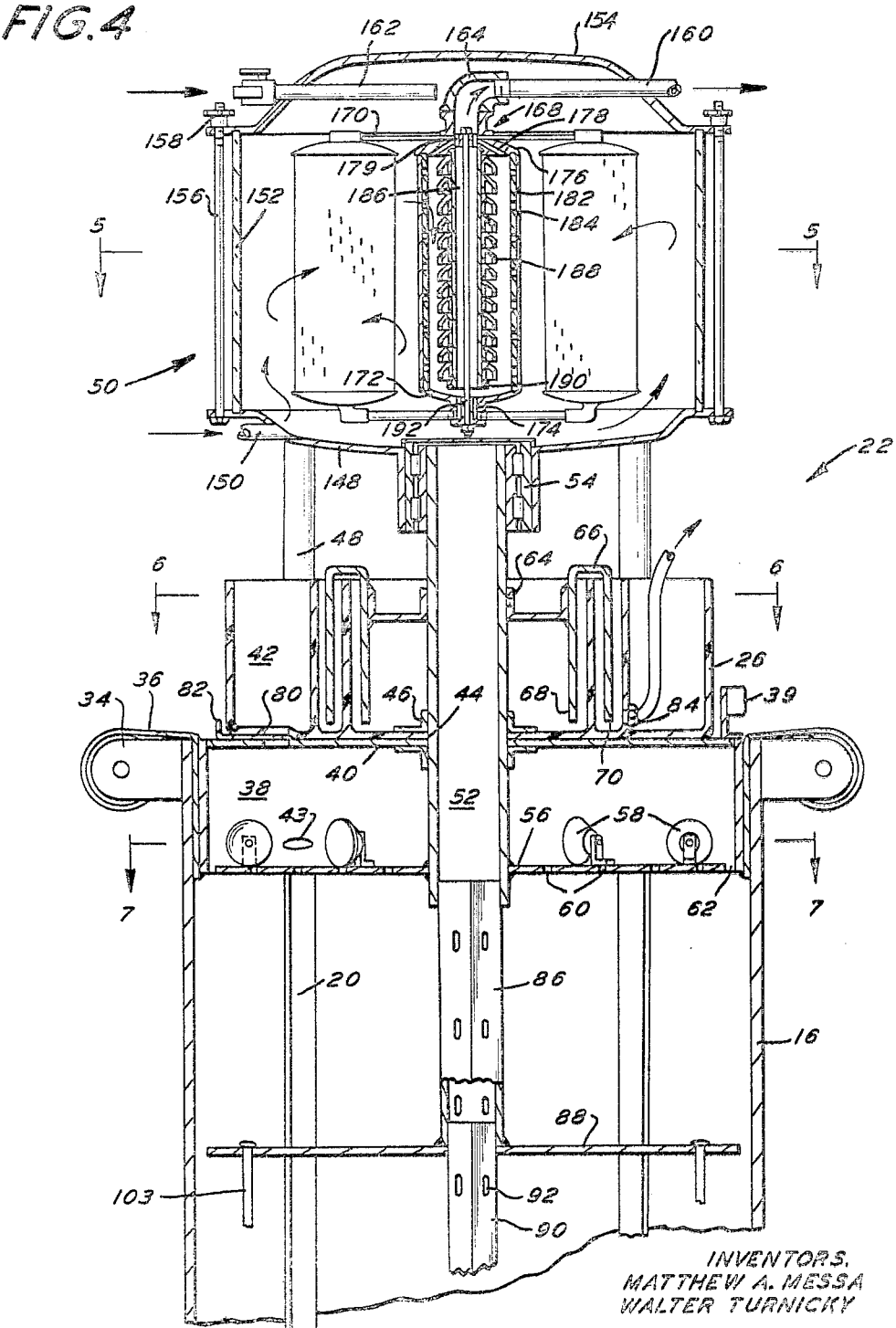
FIGURE 4 is a sectional view, in elevation, showing details of the water purification apparatus.
Figure 5:
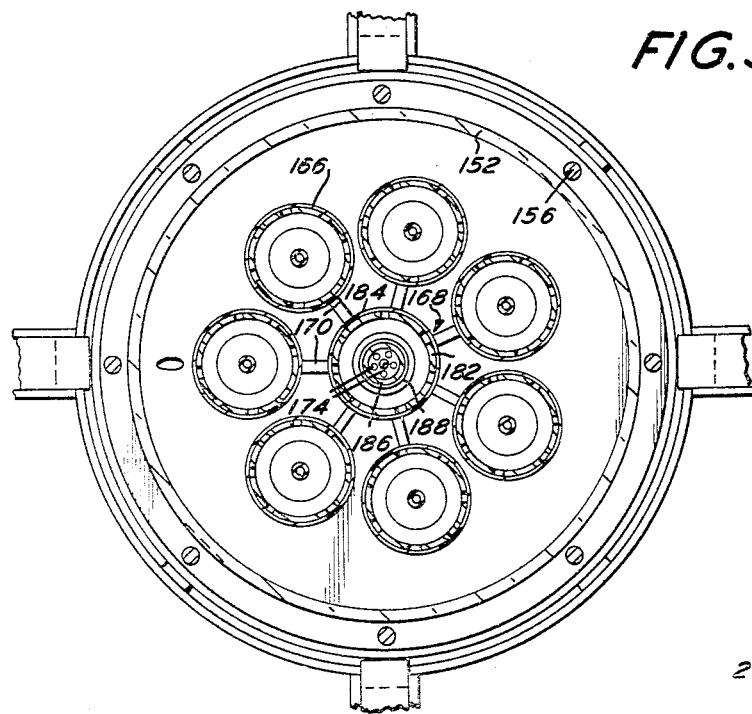
FIGURE 5 is a sectional view taken along the line 5—5 in FIGURE 4.

As is seen more clearly in FIGURES 4 and 5, a turbine housing 38 is received in the upper portion 16 of the downcomer 14 for sliding in a vertical direction. Secured to the brackets 34 are spiral springs 36. The free ends of the springs 36 are secured adjacent the lower edge of the turbine housing 38 and bias the housing to a raised position with respect to the upper portion 16. Teflon strips 20 provide a bearing surface between the upper portion 16 and the turbine housing 38.

Mounted on the turbine housing 38 at spaced points thereon are pads 39. The pads 39 are of plastic material and serve to prevent cocking of the turbine housing 38 in the upper portion 16.

The turbine housing 38 includes an upper wall 40. Secured to the upper wall 40 is a solution feed vessel 42 which will be more fully described later.

The turbine housing 38 has an opening 43 in its periphery. When the turbine housing 38 is in a raised position with respect to the upper portion 16, the opening 43 is in alignment with a high pressure water inlet nozzle 45 secured to the upper portion 16 of the downcomer. Thus, water from the inlet nozzle 45 may flow through the opening 43 into the turbine housing.

The turbine housing 38 has an opening 44 in its upper wall 40. Fixedly secured in the opening 44 is a sleeve bearing 46. A shaft 52 is rotatably mounted in the sleeve bearing 46.

Support rods 48 are secured to the upper wall 40 of the turbine housing 38. A filter assembly designated generally by the numeral 50 is secured to the upper end portions of the support rods 48.

A roller bearing assembly 54 is secured to a bottom portion of the filter assembly 50. An upper end of the rotatable shaft 52 is received in a movable portion of the roller bearing assembly 54.

Fixedly secured to the rotatable shaft 52 is a water turbine 56. The water turbine 56 includes a disk member and a series of buckets 58 disposed on the disk member in circular array. The disk member includes numerous openings 60. The size of the water turbine is such that a clearance opening 62 exists between the disk and the inner periphery of the turbine housing 38. The openings 60 and the clearance space 62 permit water to flow downwardly past the water turbine 56. A collar 64 is secured to the rotatable shaft 52 by a set screw or similar means. Fixedly secured to the collar 64 is a solution agitator member 66. The solution agitator member 66 includes downwardly extending fingers 68 and 70 which extend into the solution feed vessel 42. Thus, rotation of the shaft 52 causes movement of the fingers 68 and 70 to agitate the chemicals in the solution feed vessel.

Figure 6:
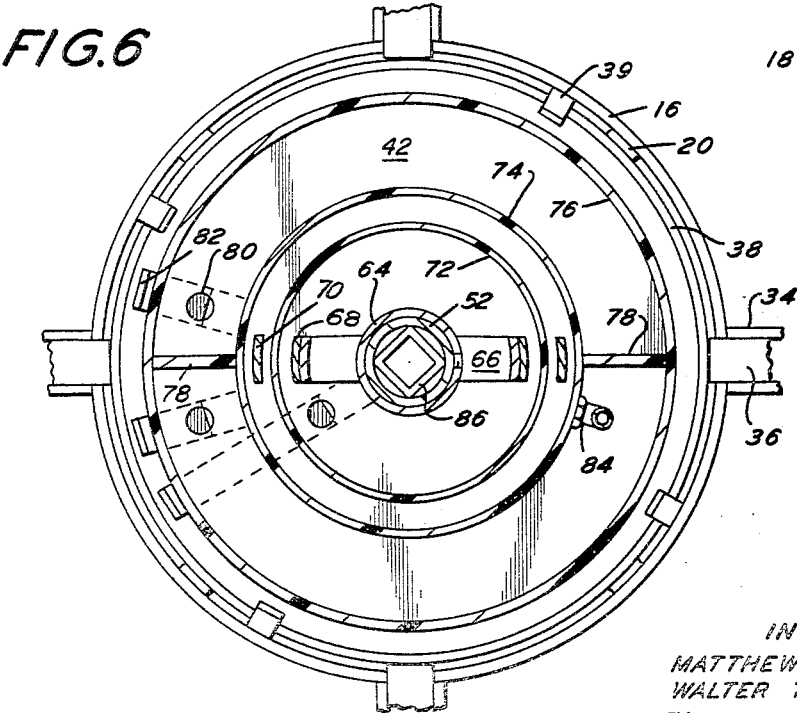
FIGURE 6 is a sectional view taken along the line 6—6 in FIGURE 4.

As seen in FIGURE 6, concentric shells 72 and 74 are disposed within the solution feed vessel 42. Thus, the shells define a series of concentric mixing chambers. The chamber defined by the outermost shell 74 and an outer wall 76 of the solution feed vessel 42 is broken into two chambers by diametrically spaced dividers 78. The fingers 68 and 70 of the solution agitator member 66 each extend into a respective compartment to agitate the chemicals therein.

Openings 80, which extend through the upper wall 40 of the turbine housing 38 are placed in the bottom of the outermost and innermost compartments. Metering plates 82 are interposed between the solution feed vessel 42 and the upper surface 40 of the turbine housing 38 adjacent the openings 80. The metering plates 82 are slidable in a manner which permits them to effectively vary the size of the openings 80, and thus regulate the flow of materials therethrough.

A suction fitting 84 is secured to the shell 74 adjacent the bottom wall of the solution feed vessel and in communication with the compartment defined by the shells 72 and 74. The purpose of the fitting 84 will be more fully described later.

As is seen in FIGURES 4 and 5, a first section 86 of a collapsible agitator shaft is secured to the rotatable shaft 52. The first section 86 of the agitator shaft may be moved axially in telescoping engagement with the rotatable shaft 52, but is not rotatable with respect thereto. A first agitator disk 88 is fixedly secured to the first section of the agitator shaft adjacent its lower end. Thus, rotation of the shaft 52 results in rotation of the first section 86 of the agitator shaft. The first section 86 of the agitator shaft includes de-aeration openings 92 which permit entrapped gases to escape from within the shaft.

A second section 90 of the agitator shaft is secured to the first section 86. The second section 90 is arranged to nest within the first section 86, and can be moved relative to the first section 86 only in an axial direction. A second agitator disk 94 is fixedly secured to the second section 90 of the agitator shaft adjacent its lower end. Second section 90 also includes de-aeration openings.

Third and fourth sections 96 and 100 of the agitator shaft are constructed in a similar manner. The third and fourth sections 96 and 100 of the agitator shaft include third and fourth agitator disks 98 and 102 at their respective lower ends.

Tie members 103 are placed between the respective agitator disks to limit relative axial extension of the respective sections of the agitator shaft.

An agitator shaft extension 104 is telescopingly received in a lower portion of the fourth section 100 of the agitator shaft. The agitator shaft extension 104 includes a bore 106 which receives a pin 108.

The pin 108 is fixedly secured in upstanding relation to a bottom pan 110. The bottom pan 110 is secured to the clarifier well and forms a part thereof. The bottom pan 110 includes a drain plug 111 and a generally horizontally extending flange 113. Also secured to the bottom pan 110 are upstanding vanes or baffles 114. An arm 118, the purpose of which will be described shortly, is secured to the bottom pan 110 by a hinge 116.

Circumferentially spaced legs are provided for supporting the clarifier well. Each leg includes a lower leg portion 120. Secured to the lower leg portion 120 adjacent its lower end is a relatively wide foot 121. Also secured to the lower leg portion 120 is a bracket 122.

Referring now to FIGURE 3, an upper leg portion 124 in the form of a rod is in telescoping engagement with the lower leg portion 120. A clamp or hand-operated set screw 126 is secured to the lower leg portion adjacent its upper end. A clamp or hand-operated set screw 128 is secured adjacent the upper end of the upper leg portion 124.

A support member 130 is pivotally connected at one end to the rod 32 by means of a selectively lockable friction hinge 132. The other end of the support member 130 is adapted to be held by the clamp 128.

Secured to the support member 130 is a flexible loop 134. The loop 134 supports a wet well 136, which is a means for collecting and drawing off clarified water.

The wet well 136 takes the form of a generally circular receptacle with a closed bottom and generally vertical sides. The sides include orifices adjacent their upper edges which provide a weir over which clarified water falls to enter the wet well. A fitting 140 may be secured to the side of the wet well adjacent its bottom portion. The fitting 140 may be attached by suitable hoses to the suction side of a pump. It will be understood that the wet well is advantageously constructed of relatively flexible plastic or rubber material so that it may be readily deformed to facilitate folding of the apparatus.

Referring now to FIGURES 9, 10 and 13, secured to the brackets 122 on the lower leg portions 120 are spiral springs 142. These springs may be of the constant tension type mentioned above. Loops 144 are secured to the outer surface of the clarifier well 11 at circumferentially spaced points therealong. Respective ends of the springs 142 are secured to the brackets 122 on adjacent legs. The medial portions of the springs 142 are passed through the loops 144.

Referring now to FIGURES 4 and 5, there is shown the novel filter arrangement which forms a part of the present invention.

The filter assembly 50 includes a bottom pan 148. The bottom pan 148 includes an inlet pipe 150. Resting on the bottom pan 148 is a cylindrical shell 152 of transparent material. It has been found that the product known as "Lexon" is suitable for this purpose. A cover member 154 rests atop the cylindrical shell 152. Tie bolts 156, which pass through the bottom pans 148 and cover member 154, and nuts 158, are effective to hold the bottom pan and cover in water-tight engagement with the cylindrical shell. It is of course evident that suitable gaskets may be used between the bottom pan and cover member and the cylindrical shell.

An outlet pipe 160 is fixedly secured to the cover member 154. Also secured to the cover member 154 is the backwash fitting 162. The backwash fitting 162 is provided with a suitable normally closed valve. An elbow fitting 164 is secured to the outlet pipe 160 for a purpose which will become apparent.

A novel central filter element is designated by the reference numeral 168. The central filter element 168 includes a lower end cap 172, an upper end cap 176 and a perforated cylindrical metal tube 182 between the respective end caps. A plastic membrane sleeve 184, which includes numerous slits is arranged in overlying relation to the perforated metal tube. A manifold tube 186 is secured to the upper end cap by screw threads or similar means. A bolt 192 passes through the upper and lower end caps and holds the caps and the perforated metal tube 182 in assembled relation.

The lower end cap 172 includes passages 174 through which water may enter the central filter element. The upper end cap 176 includes passages 178, which are in fluid communication with further passages 179. A series of cups 188 of plastic material are disposed around the manifold tube 186 and within the perforated metal tube 182. The plastic cups 188 have their open ends disposed in a downward direction for a purpose which will be made clear later.

The elbow fitting 164 is secured by bolts or other means to the upper end cap 176. Passages 179 are in fluid communication through the elbow fitting 164 with the outlet pipe 160.

Disposed around the central filter element 168 are filter elements 166. Filter elements 166 are of the type disclosed in United States Patents Nos. 2,423,172, 2,720,314, and 2,768,751. Each of the filter elements 166 is connected to the central filter element 168 by tubes 170 at its upper and lower ends. Thus, water filtered through each of the filter elements 166 passes through the tubes 170, the passages 174 and 179, the manifold tube 186 and the outlet pipe 160. Water filtered through the central filter element 168 passes through the passages 178 or the manifold tube 186 and out the outlet pipe 160.

Figure 1:
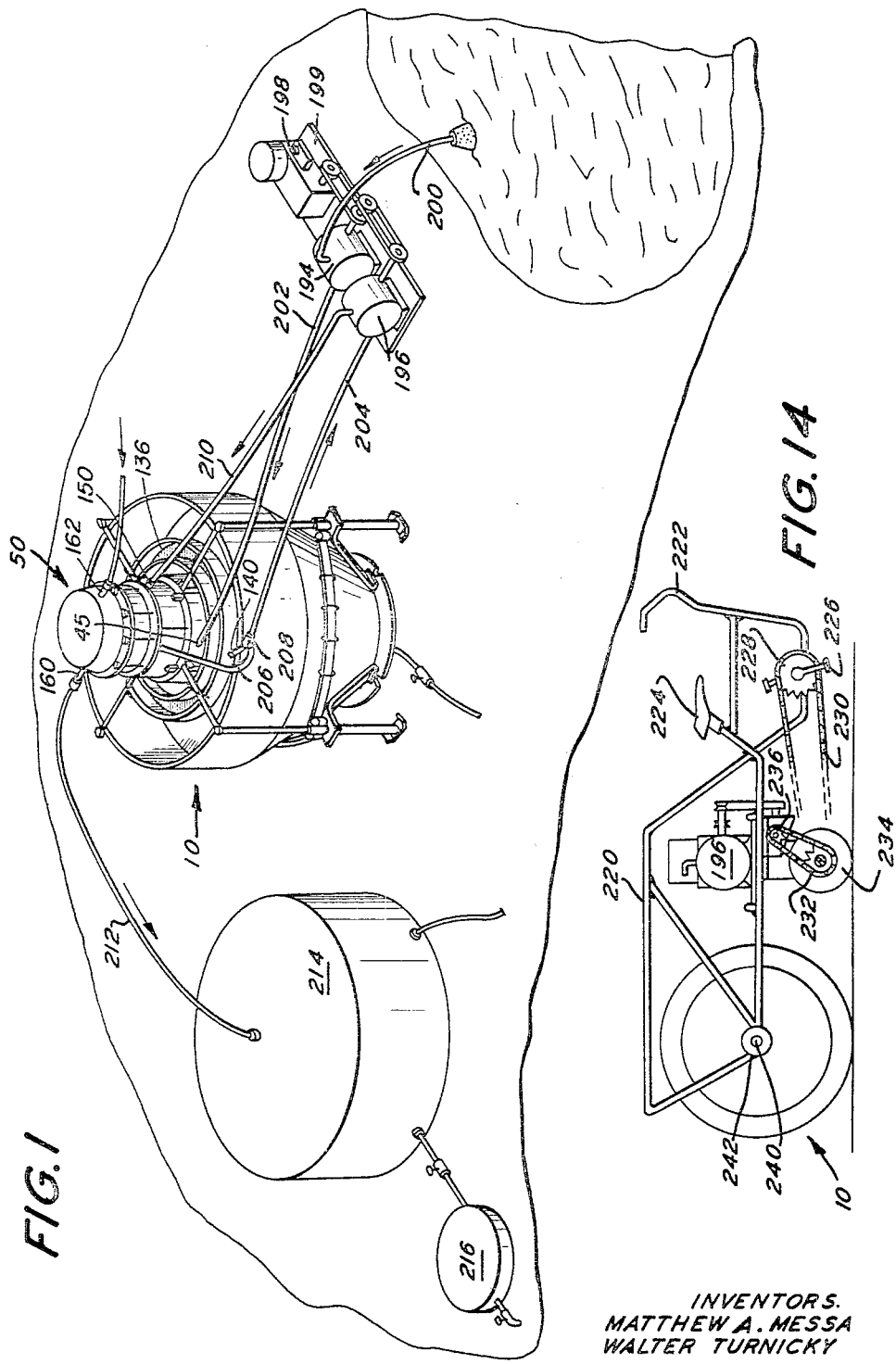
FIGURE 1 is a perspective view showing the novel water purification apparatus assembled and ready for operation.
Figure 2:
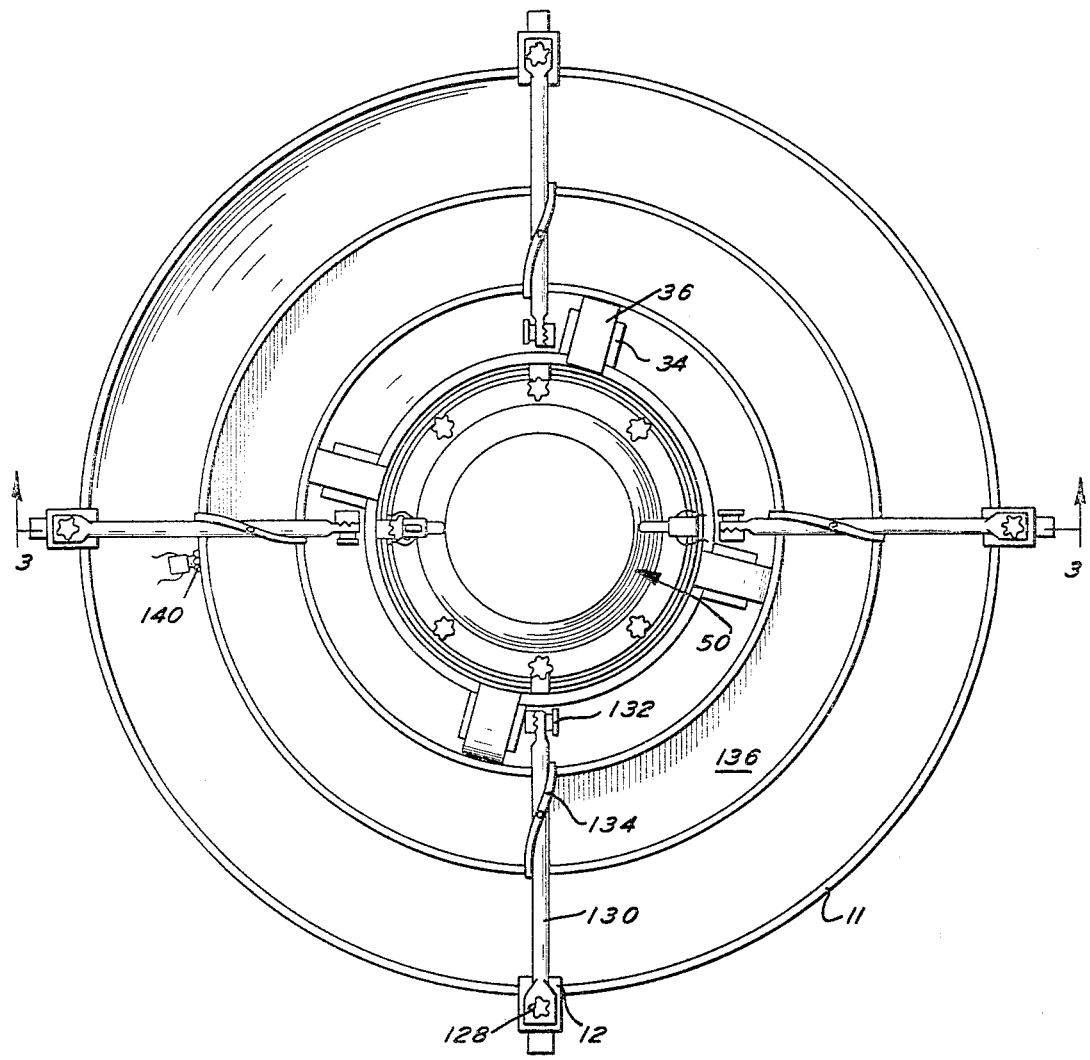
FIGURE 2 is a plan view of the water purification apparatus.

FIGURE 1 shows the novel water purification apparatus erected and prepared for operation. Thus, a chassis 199 includes a pair of pumps 194 and 196, driven by a gasoline motor 198. An intake hose 200 extends from a source of raw water to the pump 194. A hose 202 extends from the pressure side of the pump 194 to the inlet nozzle 45 on the upper portion 16 of the downcomer. A hose 204 extends from the fitting 140 on the wet well 136 to the suction side of the pump 196. A T-connection 208 is inserted in the hose 204. A hose 206 is connected at one end to the fitting 84 of the solution feed vessel and at its other end to the T-connection 208.

A hose 210 is secured at one end to the pressure side of the pump 196 and at its other end to the inlet pipe 150 of the filter assembly 50. Hose 212 extends from the outlet pipe 160 of the filter assembly 50 to a storage reservoir 214. Purified water may be drawn from the reservoir to a portable tank 216 to facilitate distribution.

In preparing the apparatus for operation, the clarifier well 11 and downcomer 14 will first be filled with raw water. This may be accomplished by disconnecting the hose 202 from the nozzle 45 and directing water directly into the clarifier well 11. It is pointed out that the numerous hose connections are advantageously provided with quick-acting couplings. One coupling found suitable for this application is that shown in United States Patent 2,518,026. While the clarifier 11 is filling, coagulants and coagulant aids are placed in the solution feed vessel. Typical coagulants are ferric chloride, which is available as a solution, and aluminum sulfate (alum), which may be obtained in the form of lumps or a fine powder. The coagulant is placed in one of the compartments defined by the shell 74, the wall of the solution feed vessel and the dividers 78. Limestone in powdered form is placed in the innermost compartment and the compartment is then filled with water. Diatomaceous silica and water are placed in the compartment with which the fitting 84 communicates. The remaining outer compartment may be filled with a solution of sodium hypochlorite. When the clarifier well 11 has substantially filled, the hose 202 may be secured to the inlet nozzle 45. Water passes under pressure through the inlet nozzle 45 and the opening 43 in the turbine housing 38. The incoming water then impinges upon the buckets 58 of the water turbine 56. Those skilled in the art will appreciate that in passing through the inlet nozzle 45 and impinging upon the buckets 58, the incoming raw water is aerated, and entrained gases are released. Thus, the novel apparatus both aerates the water and uses it to drive the agitator.

Impact of the incoming water on the buckets 58 of the water turbine 56 causes rotation of shaft 52. Rotation of the shaft 52 results in rotation of the various agitator members. Also, rotation of the shaft 52 results in movement of the solution agitator member 66. The fingers 68 and 70 of the solution agitator member 66 cause the powdered limestone and diatomaceous silica to remain in suspension in the solution feed vessel. By adjustment of the metering plates 82 to vary the effective sides of the openings 80, the coagulants and coagulant aids may be introduced into the turbine housing in measured amounts. Introduction of the chemicals into the turbine housing results in a rapid relatively violent initial mixing with the incoming water.

Mixing of the coagulants and coagulant aids with the raw water is completed in the downcomer. The rotating agitator provides uniform rapid mixing of the chemicals and the aerated water. The agitator disks tend to prevent surging of the water within the downcomer and the openings 92 in the respective agitator shaft sections 88, 90, 96 and 100 permit the escape of gases liberated from solids in the incoming water.

Mixture of the coagulant chemicals with water results in the formation of gelatinous floc in suspension in the water. The floc particles tend to grow in size and become more numerous as mixing continues toward the bottom of the downcomer. The flocculated water flows out of the downcomer and into contact with the vanes or baffles 114 on the bottom pan 110. The vanes or baffles 114 tend to control the direction of movement of the water, and stabilize its motion. Thus, settling of the suspended floc particles is controlled.

Adjustment of the amount of limestone introduced into the downcomer is effective to vary the specific gravity of the resultant floc particles. The floc particles will tend to rise within the clarifier well to a point at which the hydraulic forces due to the efflux of water from the downcomer and the buoyant forces on the particles are equal to the force of gravity on the particles. The particles will tend to form a dense suspended blanket, indicated in FIGURE 3 as F at this point. Thus, by varying the amount of limestone introduced into the downcomer, the height of the floc blanket may be varied.

It will be appreciated that due to the rotation of the agitator and the effect of the baffles 114, water leaving the downcomer tends to follow a helical path up the frusto-conical sides of the lower portion of the clarifier well 11. The water passes through the floc blanket, and leaves a large percentage of its suspended matter in the floc blanket. In actual practice, it has been found that 98–99 percent of the suspended organic and inorganic matter or turbidity may be removed in passage through the clarifier.

The clarified water which accumulates above the floc blanket rises to the level of the orifices 137 in the wet well 136, and then falls into the wet well to be drawn off for filtration. The filter elements 166 and the novel central filter elements 168 rely for their effectiveness on a layer of micro-porous diatomaceous silica deposited on a plastic membrane. In preparation for filtration, therefore, the diatomaceous silica must first be deposited. In the novel apparatus of this invention, the layer is placed on the filters in the following manner.

Clarified water is drawn from the wet well 136 through the fitting 140 and the hose 204 by means of the pump 196. The hose 206 secured to the fitting 84 and the T-fitting 208 serves to draw off the charge of diatomaceous silica from the solution feed vessel. The mixture of clarified water and diatomaceous silica is then passed through the hose 210 to the filter assembly 50. The mixture passes through the plastic membrane sleeves of the respective filter elements 166 and the plastic membrane sleeve 184 of the central filter element 168. The diatomaceous silica remains on the plastic membrane sleeve while the water continues through the outlet pipe 160, to be recirculated or discarded. After the initial charging of the filter assembly 50, clarified water is taken from the wet well 136 and passed through the filter assembly 50 to the hose 212 and then to the storage reservoir 214.

The condition of the filters may be readily inspected by observation through the transparent shell 152. Should it become apparent that the filters are in need of cleaning, this may be accomplished by means of the backwash fitting 162. Operation of the fitting 162 permits the release of a small amount of air compressed in the upper portion of the filter assembly 50. This results in a sudden decrease in pressure within the assembly 50 and causes sudden expansion of the air trapped by the plastic cups 188. This sudden expansion causes momentary flexing of the plastic membrane sleeve 184 and forces some of the filtered water back through the membrane sleeve. Thus, the diatomaceous silica and accumulated particles are removed from the filter elements.

A novel and useful aspect of the present invention is the collapsibility of the apparatus into a light and compact package for transport. When it is desired to move the unit, the drain plug 111 in the bottom pan 110 is opened to drain the clarifier. The floc particles pass out of the drain at the bottom of the clarifier 11. It is also possible to draw off the floc blanket through the fitting 13. See in this regard FIGURE 3. The water remaining in the wet well and filter may be pumped to the reservoir. The various hoses are then disconnected.

The filter assembly 50, solution feed vessel 42, and turbine housing 38 may be pushed downwardly into the upper portion 16 of the downcomer 14. A latch, not shown, may be provided to keep the movable assembly in its retracted position.

The clamp 128 is next loosened and the support members 130 folded into the clarifier well 11. The wet well 136 may be dropped into the clarifier.

The support brackets 12 may be removed from the upper leg portions 124 and the upper portion of the clarifier folded inwardly toward the downcomer. It will be appreciated that the support members 130 and the weight of the water in the clarifier 11 are effective to resist the inward bias of the springs 142. It will be appreciated that now, with the support members 130 removed and the clarifier emptied, the springs 142 tend to move the leg members inwardly toward each other, further collapsing the clarifier.

Upon inward movement of the legs, the arms 118 pivot about the hinges 116 and tend to raise the legs so that the feet 121 on the lower leg portions, when the arms 118 are vertically disposed, are slightly below the flange 113.

The hand-operated clamps 126 may be loosened and the upper leg portions 124 collapsed into the lower leg portions 120.

The upper portion 16 of the downcomer 14 may now be pressed downwardly into the lower portion 18. It is apparent that the sections 86, 90, 96 and 100 of the agitator shaft will automatically telescope upon telescoping of the downcomer. It will also be seen that the agitator shaft extension 104 will reach a nested position within the fourth section 100 of the agitator shaft. Latch means, not shown, may be used to hold the upper and lower sections of the downcomer 14 fixed in collapsed relation to each other.

It is readily apparent that the force needed to collapse the filter assembly 50, solution feed vessel 42, and turbine housing 38 with respect to the upper portion 16 of the downcomer will be approximately the difference between the total upward force generated by the springs 36 and the weight of the movable assembly. Thus, if the springs are sufficiently strong, no latch means need be provided to secure the assembly in its raised position.

Similarly, the force needed to move the upper portion 16 of the downcomer 14 into nested relation within the lower portion 18 of the downcomer is the difference between the total upward force due to the springs 28 and the weight of the suspended assembly comprising the upper portion 16, the filter assembly 50, solution feed vessel 42, the turbine housing 38 and the rest of the parts movable therewith.

As seen in FIGURES 12 and 13, the apparatus, when collapsed, forms an extremely compact package. For example, the erected clarifier of the unit having an output of 600 gallons per hour would have a diameter of 52 inches and a height of 44 inches. These dimensions are dictated by the nature of the flow within the downcomer and clarifier, and are the same as those of previously known units such as the above-mentioned Helifloc apparatus.

By comparison, when in the folded condition, the apparatus of the invention forms a package with a diameter of 29 inches and an overall height of 28 inches.

While previously known units have separate clarifier solution feed and filtration assemblies, and had to be mounted on a skid 51 inches by 102 inches, the present invention places all three items in the 29" by 28" package.

As seen in FIGURE 12, a rigid cover 146 may be supplied to protect the apparatus when in the folded position and to complete the package. The clamps 128 at the upper ends of the upper leg portions 124, which engage the support members 130 when the apparatus is in its erected position, are now used to secure the cover member 146. It is also apparent that the clamps or hand-operated set screws 126 on the lower leg portions 120, which are omitted in FIGURE 12 for clarity, may be tightened to prevent inadvertent elongation of the package due to the action of the springs 28 and 36.

Thus, as indicated in the above specification, the novel apparatus of the present invention simplifies the purification of water in several respects. In the course of aeration, the incoming water drives an agitator, hence eliminating the need for an agitator drive motor. The solution feeder is incorporated into the clarifier structure, thus eliminating the need for a separate slurry feed device. The filter assembly is decreased in size and weight with no decrease in filter area by incorporating a novel central filter element which also serves as a manifold for other filter elements. Lastly, the entire apparatus is made readily portable by collapsing it into a compact and relatively light package.

FIGURE 14 illustrates a novel means by which the apparatus of the present invention may be easily transported.

A frame 220 includes a pusher handle 222 and a seat 224. Also mounted on the frame is a sprocket 228, driven by a pair of pedals 226. The sprocket 228 drives a chain 230 which in turn is drivingly engaged with one of a pair of axially aligned sprockets 232. The other axially aligned sprocket is secured to a second chain, not numbered, which is drivingly engaged with a sprocket 236.

The chassis 199 which supports the pumps 196 and 194, and the motor 198 may be fixed to the frame 220 by hand-operated clamps.

The sprocket 236 may be connected by means of gears, a shaft, or drive belts to the shafts of the pumps 194 and 196. The frame 220 includes a journal 242.

An axle 240 may be secured to the cover member 146 and bottom pan 110 of the water purification apparatus by means of screw threads, bolts or other means which may occur to those skilled in the art. The axles 240 are placed in engagement with the journals 242.

It will of course be understood that the cover member 146 and bottom pan 110 have equal outer diameters, and hence, co-extensive peripheries.

Thus, the water purification apparatus forms a roller or wheel for the frame 220 which may be pushed and guided by a single man holding the pusher handles 222, or towed by a vehicle, not shown.

Additionally, where gasoline or other motor fuels are unavailable, or where the noise of the gasoline motor would be undesirable, the frame 220 may be placed on blocks, and the pumps 194 and 196 driven by means of the pedal actuated chain 230.

It will also occur to those having skill in the art that the roller or wheel formed by the water purification apparatus 10 may be linked to, and selectively driven by, the gasoline motor 198. Such an arrangement would reduce the work of the attendant to guiding the assembly by means of the handles 222.

We claim:

1. Apparatus for purifying water comprising a clarifier having a closed lower end and a generally circular cross-section, a downcomer located axially of said clarifier, said downcomer comprising a hollow cylindrical portion, a lower portion of said downcomer comprising a flared, generally conical portion adjacent said closed lower end of said clarifier so that water can flow from said downcomer into said clarifier, an agitator pivotably mounted in said downcomer, a turbine housing mounted in said downcomer for vertical sliding movement relative thereto, a water turbine within said housing, said turbine being in driving relation to said agitator, and a filter assembly secured to said turbine housing, said filter assembly having a transverse dimension less than that of said downcomer so that said filter assembly may be nested within said downcomer.

2. Apparatus in accordance with claim 1 wherein biasing means are provided to bias said turbine housing upwardly with respect to said downcomer.

3. Apparatus for purifying water comprising a clarifier, said clarifier having a closed lower end and a generally circular cross section, a downcomer located axially of said clarifier, said downcomer defining a hollow cylinder, a lower portion of said downcomer being adjacent said closed lower end of said clarifier so that water can flow from said downcomer into said clarifier, an agitator pivotably mounted in said downcomer, a turbine housing mounted in said downcomer for vertical sliding movement relative thereto, a water turbine within said housing, said turbine being in driving relation to said agitator, a solution feeder secured to said turbine housing and movable therewith, said solution feeder including means for dispensing chemical solutions into said downcomer, a filter assembly mounted on said turbine housing, said filter assembly having a transverse dimension less than that of said downcomer so that said filter assembly may be nested within said downcomer.

4. Apparatus for purifying water comprising a clarifier having a closed lower end and a generally circular cross section, said clarifier comprising a rigid bottom pan and a body portion of relatively thin flexible material, a plurality of circumferentially spaced loops on the outer surface of said body portion, a plurality of leg members for supporting said clarifier, said leg members comprising a lower leg portion and an upper leg portion in telescoping relation thereto, means for securing said upper leg portion to said clarifier, means interconnecting each of said leg members and passing through said loops so that adjacent leg members are biased toward each other, a downcomer located axially of said clarifier, said downcomer defining a hollow cylinder and comprising a lower portion and an upper portion, said upper portion being in telescoping relation to said lower portion so that one of said portions may be placed in nesting relation to the other, said lower portion being adjacent said bottom pan so that water can flow from said downcomer into said clarifier, an agitator in said downcomer, said agitator comprising a plurality of telescopible sections, means for driving said agitator, a tie rod member extending from said upper portion of said downcomer to said upper leg portion and adapted to be secured to said upper leg portion, and means in said clarifier whereby clarified water may be drawn from said clarifier.

5. Apparatus in accordance with claim 4 wherein arm members are pivotably secured to said bottom pan and upper portions of said arm members are pivotable and slightly engaged with said lower leg portions.

6. Apparatus for purifying water comprising a clarifier having a closed lower end, said clarifier comprising a rigid bottom pan and a body portion of relatively thin flexible material, a plurality of circumferentially spaced loops on the outer surface of said body portion, a plurality of collapsible leg members supporting said clarifier, means interconnecting said leg members, said means passing through said loops and biasing said leg members toward each other, a downcomer member located axially of said clarifier, said downcomer member defining a hollow cylinder and comprising a lower portion and an upper portion, said upper portions being in telescoping relation to said lower portion so that one of said portions may be placed in nesting relation to the other, a lower portion of said downcomer being supported by said bottom pan in spaced relation thereto so that water may flow from said downcomer into said clarifier, an agitator mounted in said downcomer, and means for driving said agitator.

7. Apparatus in accordance with claim 6 wherein said agitator is in axial alignment with said downcomer and comprises a plurality of relatively telescopible sections, the lowermost of said sections being pivotably engaged with said bottom pan.

8. Apparatus in accordance with claim 6 wherein said agitator is in axial alignment with said downcomer and comprises a plurality of relatively telescopible sections, the lowermost of said sections being pivotably engaged with said bottom pan, said means for driving said agitator comprising a water turbine in said downcomer, said water turbine being axially aligned with said agitator and in driving engagement therewith.

9. Apparatus in accordance with claim 6 wherein said interconnecting means comprises a spiral spring.

10. Apparatus in accordance with claim 9 wherein said agitator is in axial alignment with said clarifier and comprises a plurality of relatively telescopible sections, the lowermost of said sections being pivotably engaged with said bottom pan, a turbine housing slidably mounted in said upper portion of said downcomer for vertical slidable movement with respect thereto, said means for driving said agitator comprising a water turbine within said turbine housing and drivingly engaged with said agitator, said filter assembly being secured to said turbine housing.

11. Apparatus in accordance with claim 10 wherein a solution feeder is secured to said turbine housing, said solution feeder including means for dispensing chemical solutions into said downcomer.

12. Apparatus comprising a filter assembly mounted in an upper portion of a downcomer, said filter assembly having a transverse dimension less than that of said upper portion of said downcomer so that said filter assembly is movable from a stored position in which it is wholly enclosed within said downcomer to an erected position wherein it extends above the upper portion of said downcomer.

13. Apparatus in accordance with claim 12 wherein said upper and said lower portions of said downcomer have spiral spring means therebetween to bias said upper portion to a raised position, and said downcomer and said filter assembly have further spiral spring means therebetween to bias said filter assembly to its erected position.

14. Apparatus for purifying water comprising a clarifier, said clarifier having a rigid bottom pan and a body portion of relatively thin flexible material, a plurality of collapsible leg members supporting said clarifier, a downcomer member located axially of said clarifier, said downcomer defining a hollow cylinder and comprising an upper portion and a lower portion, said upper portion being in telescoping relation to said lower portion so that one of said portions may be placed in nesting relation to the other, the lower portion of said downcomer being supported by said bottom pan and in spaced relation thereto so that water may flow from said downcomer into said clarifier, an agitator mounted in said downcomer, means for driving said agitator and means in said clarifier for drawing off clarified water.

15. Apparatus in accordance with claim 14 wherein said agitator is mounted in said downcomer in axial alignment therewith, said agitator comprising a plurality of relatively telescopible sections, the lowermost of said sections being pivotably engaged with said bottom pan.

16. Apparatus in accordance with claim 14 wherein said agitator is in axial alignment with said downcomer and comprises a plurality of relatively telescopible sections, the lowermost of said sections being pivotably engaged with said bottom pan, said means for driving said agitator comprising a water turbine in said downcomer, said water turbine being axially aligned with said agitator and in driving engagement therewith.

17. Apparatus in accordance with claim 15 wherein each of said sections comprises an elongated shaft, said shaft having a plurality of aeration openings therein and a disk member secured adjacent its lower end, the lowermost of said sections having a pivot member for engagement with said bottom pan.

18. Apparatus in accordance with claim 15 wherein a filter assembly is mounted in said upper portion of said downcomer, said filter assembly having a transverse dimension less than that of said upper portion of said downcomer so that said filter assembly is movable from a stored position in which it is wholly enclosed within said downcomer to an erected position wherein it extends above the upper portion of said downcomer.

19. Apparatus in accordance with claim 18 wherein said upper and said lower portions of said downcomer have spring means therebetween to bias said upper portion to a raised position, and further spring means are provided to bias said filter assembly to its erected position.

20. Apparatus in accordance with claim 19 wherein said agitator is in axial alignment with said clarifier and comprises a plurality of relatively telescopible sections, the lowermost of said sections being pivotably engaged with said bottom pan, a turbine housing slidably mounted in said upper portion of said downcomer for vertical slidable movement with respect thereto, said means for driving said agitator comprising a water turbine within said turbine housing and drivingly engaged with said agitator, said filter assembly and said further spring means being secured to said turbine housing.

21. Apparatus in accordance with claim 20 wherein a solution feeder is secured to said turbine housing, said solution feeder including means for dispensing chemical solutions into said downcomer.

22. Collapsible apparatus for purifying water comprising a clarifier having a closed lower end, said clarifier having a body portion of relatively thin flexible material so that said clarifier is adapted to be folded to a collapsed position, a downcomer in axial alignment with said clarifier, said downcomer being collapsible along its longitudinal axis, an agitator in said downcomer, and means in said downcomer for driving said agitator, a plurality of collapsible leg members, an upper portion of each of said leg members being adapted to be secured to said clarifier body member, spring means secured to said leg members and said clarifier body member so that said legs are urged together upon collapsing of said clarifier, a wet well in said clarifier, said wet well being of relatively flexible material so that it may be folded into said clarifier body portion upon collapsing of said clarifier, and means adapted 23. Apparatus in accordance with claim 22 wherein said clarifier includes a rigid bottom pan, a plurality of arm members pivotably secured to said bottom pan, each of said arm members having an upper portion in slidable and pivotable engagement with one of said leg members.

24. Apparatus in accordance with claim 23 wherein said means adapted to be secured to said leg member for supporting said wet well comprises rods pivotably secured at one end to said downcomer.

25. Apparatus in accordance with claim 24 wherein said bottom pan includes a generally horizontally extending flange having a plurality of notches therein, said notches having a transverse dimension greater than that of said leg members so that said leg members may rest in said notches upon collapsing of said clarifier, each of said legs having an enlarged foot portion adjacent its lower end, the transverse dimension of said foot portions being larger than that of said notches so that said leg members cannot be removed from said notches in a vertical direction, a rigid cover member for said apparatus, stud means secured to said leg members at an upper portion thereof, said stud means adapted to be secured to said cover member so that said apparatus forms a closed package having a rigid upper portion defined by said cover member and a rigid lower portion defined by said bottom pan.

26. Apparatus in accordance with claim 22 wherein said agitator is mounted in said downcomer in axial alignment therewith, said agitator being collapsible along its longitudinal axis.

27. Apparatus in accordance with claim 26 wherein a turbine housing is slidably mounted in said downcomer for movement in a vertical direction, said means for driving said agitator comprising a turbine mounted in said turbine housing in driving engagement with said agitator, a filter assembly secured to said turbine housing, said filter assembly having a transverse dimension less than that of said downcomer so that said filter may be moved from a first position wholly enclosed within said downcomer to a second position wherein said filter extends above said downcomer and a solution feeder secured to said turbine housing and including means for dispensing chemicals into said downcomer.

28. Collapsible apparatus for purifying water comprising a clarifier having a closed lower end, said clarifier having a body portion of relatively thin flexible material so that said clarifier is adapted to be folded to a collapsed position, a downcomer in axial alignment with said clarifier, said downcomer being collapsible along its longitudinal axis, an agitator in said downcomer, and means in said downcomer for driving said agitator, a plurality of collapsible leg members, an upper portion of each of said leg members being adapted to be secured to said clarifier body portion, spring means secured to said leg members and said clarifier body member so that said leg members are urged together upon collapsing of said clarifier and means in said clarifier for receiving clarified water.

29. A clarifier for use with collapsible water purifying apparatus comprising a rigid bottom pan and a body portion of relatively thin flexible material secured to said bottom pan, at least a portion of said body portion being frusto-conical in shape and having a generally circular cross section, and a plurality of upstanding baffle members on said rigid bottom pan, said rigid baffle members adapted to support a downcomer and to direct the flow of water from said downcomer.

30. In collapsible purifying apparatus comprising a collapsible clarifier, a filter assembly and a collapsible downcomer, said clarifier having a rigid bottom portion, and a cover member adapted to be secured to said apparatus when said clarifier and downcomer are in a collapsed position, said cover member and said rigid bottom portion of said clarifier having coextensive peripheries for facilitating rolling of said apparatus.

31. Apparatus in accordance with claim 30 including flexible wall means surrounding said downcomer and connected to at least one of said bottom portions and said downcomer.

References Cited

UNITED STATES PATENTS

| | | | |
|---|---|---|---|
| 1,339,195 | 5/1920 | Grover | 210—250 |
| 1,343,078 | 6/1920 | Carter | 210—354 X |
| 2,429,316 | 10/1947 | Green | 210—42 X |
| 2,780,360 | 2/1957 | Bon et al. | 210—44 |
| 2,496,757 | 2/1950 | Sieling | 210—250 X |
| 2,912,111 | 11/1959 | Kovac | 210—121 X |
| 2,973,820 | 3/1961 | Hagerman et al. | 210—262 X |
| 3,313,725 | 4/1967 | Tsuda et al. | 210—261 X |

REUBEN FRIEDMAN, Primary Examiner

T. A. GRANGER, Assistant Examiner

U.S. Cl. X.R.

210—232, 316, 319